(12) United States Patent
Turek

(10) Patent No.: US 10,343,112 B2
(45) Date of Patent: Jul. 9, 2019

(54) SYSTEM AND METHOD FOR SULFUR RECAPTURE IN A CHEMICAL LOOPING SYSTEM

(71) Applicant: GENERAL ELECTRIC TECHNOLOGY GMBH, Baden (CH)

(72) Inventor: David Gordon Turek, South Windsor, CT (US)

(73) Assignee: General Electric Company, Schenectady, NY (US)

( * ) Notice: Subject to any disclaimer, the term of this patent is extended or adjusted under 35 U.S.C. 154(b) by 84 days.

(21) Appl. No.: 15/391,061

(22) Filed: Dec. 27, 2016

(65) Prior Publication Data

US 2018/0178163 A1    Jun. 28, 2018

(51) Int. Cl.
| | | |
|---|---|---|
| *B01D 53/12* | (2006.01) | |
| *B01D 53/50* | (2006.01) | |
| *F23C 10/00* | (2006.01) | |
| *F23C 10/26* | (2006.01) | |
| *F23J 15/02* | (2006.01) | |

(52) U.S. Cl.
CPC .......... *B01D 53/508* (2013.01); *B01D 53/12* (2013.01); *F23C 10/005* (2013.01); *F23C 10/26* (2013.01); *F23J 15/027* (2013.01); *B01D 2251/404* (2013.01); *B01D 2251/606* (2013.01); *F23C 2206/10* (2013.01); *F23J 15/02* (2013.01)

(58) Field of Classification Search
CPC .................. B01D 53/508; B01D 53/12; B01D 2251/404; B01D 2251/606; F23C 10/26; F23C 10/005; F23J 15/02
See application file for complete search history.

(56) References Cited

U.S. PATENT DOCUMENTS

| | | | |
|---|---|---|---|
| 3,969,089 A | * | 7/1976 | Moss .......................... B01J 8/26 48/197 R |
| 8,807,054 B2 | | 8/2014 | Beal et al. |
| 8,956,567 B2 | | 2/2015 | Lou et al. |
| 2014/0025210 A1 | | 1/2014 | Joshi et al. |
| 2014/0335461 A1 | | 11/2014 | Guillou et al. |
| 2015/0204539 A1 | | 7/2015 | Hoteit |
| 2016/0265764 A1 | | 9/2016 | Abdulally et al. |

OTHER PUBLICATIONS

International Search Report and Written Opinion issued in connection with corresponding PCT Application No. PCT/EP2017/079779 dated Feb. 26, 2018
Frederic, V., System and method for chemical looping, GE Co-pending U.S. Appl. No. 15/409,905, filed Jan. 19, 2017.
Frederic, V. and Turek, D.G., System and method for chemical looping, GE Co-pending U.S. Appl. No. 15/409,982, filed Jan. 19, 2017.

* cited by examiner

*Primary Examiner* — Daniel McCracken
(74) *Attorney, Agent, or Firm* — Frank A. Landgraff

(57) ABSTRACT

A method for recapturing sulfur in a chemical looping system includes receiving a flue gas stream containing a sulfur-containing species, reducing a temperature of the flue gas stream, introducing a calcium-based makeup material to the reduced temperature flue gas stream, capturing the sulfur-containing species from the reduced temperature flue gas stream, and recycling the sulfur-containing species to a reducer of the chemical looping system.

10 Claims, 2 Drawing Sheets

SYSTEM AND METHOD FOR SULFUR RECAPTURE IN A CHEMICAL LOOPING SYSTEM

GOVERNMENT RIGHTS

This invention was made with Government support under Contract Number DE-FE009484 awarded by the Department of Energy. The Government has certain rights in this invention.

BACKGROUND

Technical Field

Embodiments of the invention relate generally to power generation and, more particularly, to a system and method for sulfur recapture in a chemical looping system.

Discussion of Art

Chemical looping systems utilize a high temperature process whereby solids such as calcium or metal-based compounds, for example, are "looped" between a first reactor, called an oxidizer, and a second reactor, referred to as a reducer. In the oxidizer, oxygen from injected air is captured by the solids in an oxidation reaction. The captured oxygen is then carried by the oxidized solids to the reducer to be used for combustion or gasification of a fuel such as coal. After a reduction reaction in the reducer, the reacted solids, and, potentially, some unreacted solids, are returned to the oxidizer to be oxidized again, and the cycle repeats.

Periodically, solids must drained from the system to remove ash from the coal, which also removes some of calcium or metal-based compounds which are utilized as the oxygen carrier. In calcium-based systems, for example, limestone must then be added to the system as makeup material. In particular, added limestone ($CaCO_3$) then reacts with sulfur from the coal to regenerate the $CaSO_4$/CaS oxygen carrier, which is then utilized to sustain the reactions.

In existing calcium-based chemical looping systems, sulfur can be lost from the oxygen carrier in both the reducer and the oxidizer. In particular, while the temperature within the oxidizer must typically be maintained above 1700° F.-1800° F. to provide enough heat to the reducer to oxidize CaS to $CaSO_4$, such high temperatures exacerbate the loss of sulfur as sulfur dioxide ($SO_2$) from the oxygen carrier, forming CaO in place of CaS or $CaSO_4$. If the sulfur loss is too high, the hot oxygen carrier returning to the reducer may not have enough $CaSO_4$ to sustain the reactions. In particular, in certain instances, the sulfur loss from the oxidizer may exceed the sulfur fed to the reducer with the coal, such that the $CaSO_4$/CaS oxygen carrier cannot be maintained in sufficient quantities to sustain the necessary reactions.

In view of the above, there is a need for a calcium-based chemical looping system and method that minimizes or prevents excessive sulfur loss.

BRIEF DESCRIPTION

In an embodiment, a method for recapturing sulfur in a chemical looping system is provided. The method includes the steps of receiving a flue gas stream containing a sulfur-containing species, reducing a temperature of the flue gas stream, introducing a calcium-based makeup material to the reduced temperature flue gas stream, capturing the sulfur-containing species from the reduced temperature flue gas stream, and recycling the sulfur-containing species to a reducer of the chemical looping system.

In another embodiment, a chemical looping system is provided. The chemical looping system includes a reducer in which a fuel reacts with an oxygen carrier to produce reaction products, an oxidizer in fluid communication with the reducer for supplying the oxygen carrier to the reducer after an oxidizing reaction in the oxidizer, the oxidizing reaction producing a flue gas stream containing sulfur dioxide, and a sulfur recapture loop configured to receive the flue gas stream from the oxidizer. In the sulfur recapture loop a temperature of the flue gas stream is reduced and a calcium-based makeup material is reacted with the sulfur dioxide in the flue gas stream to capture the sulfur dioxide from the flue gas stream.

In yet another embodiment, a method for recapturing sulfur in a chemical looping system is provided. The method includes the steps of, with a heat exchanger, receiving a flue gas stream from an oxidizer, the flue gas stream containing sulfur dioxide, in the heat exchanger, reducing a temperature of the flue gas stream to produce a cooled flue gas stream, with a reactor, receiving the cooled flue gas stream from the heat exchanger, introducing limestone to the reactor, in the reactor, reacting the makeup limestone with the sulfur dioxide to produce $CaSO_4$, and transporting the $CaSO_4$ to a reducer of the chemical looping system.

DRAWINGS

The present invention will be better understood from reading the following description of non-limiting embodiments, with reference to the attached drawings, wherein below:

DETAILED DESCRIPTION

Figure 1:
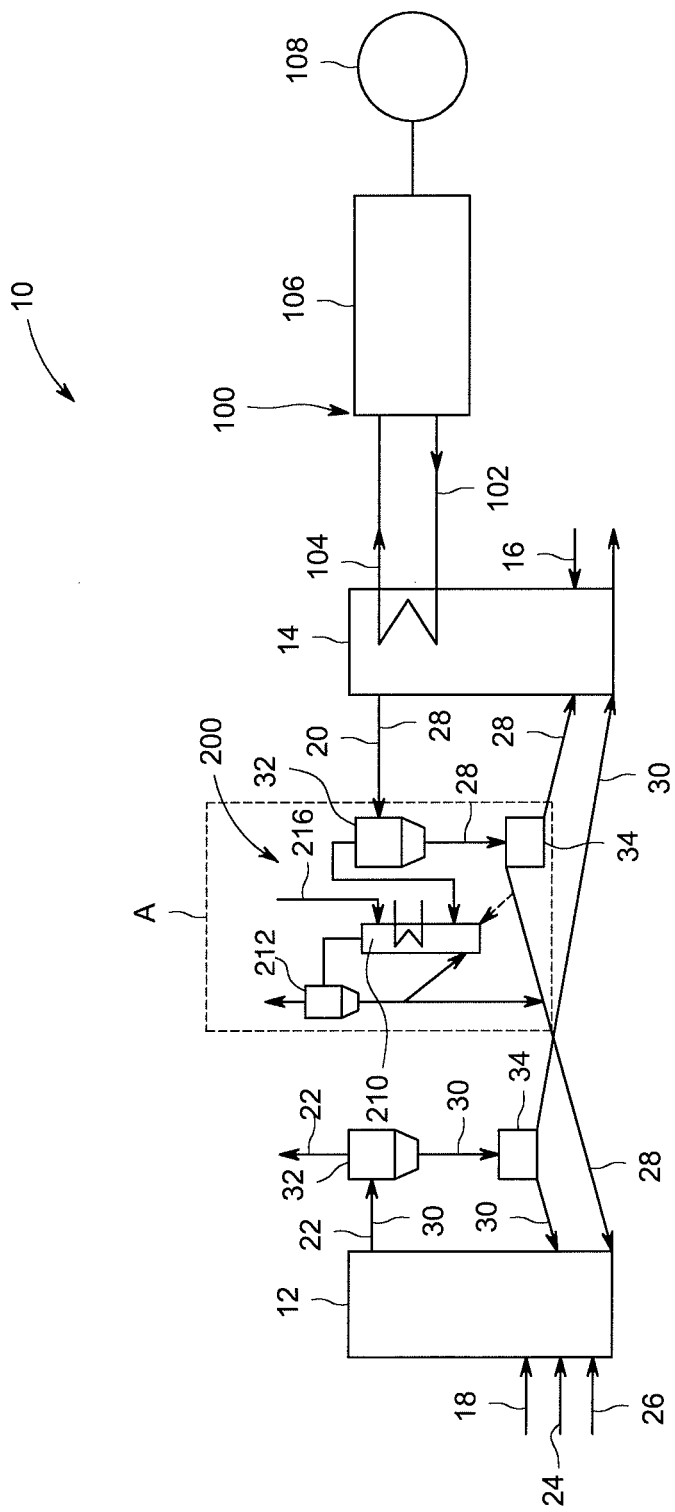
FIG. 1 is a schematic illustration of a chemical looping system according to an embodiment of the invention.

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use in a power generation process, other applications are also contemplated including but not limited to gasification processes such as, but not limited to, those used to produce syngas and those used to sequester carbon dioxide.

As used herein, "operatively coupled" refers to a connection, which may be direct or indirect. The connection is not necessarily a mechanical attachment. As used herein, "fluidly coupled" or "fluid communication" refers to an arrangement of two or more features such that the features are connected in such a way as to permit the flow of fluid between the features and permits fluid transfer. As used herein, "solids" means solid particles intended for use in a combustion process or a chemical reaction such as, for example, coal particles or limestone. The solids may contain an oxygen carrier in addition to coal particles or other fuel particles.

Embodiments of the invention relate to a system and method for recapturing sulfur from the flue gas stream from an oxidizer of a chemical looping system. In an embodiment, the system includes a reducer in which a fuel reacts with an oxygen carrier to produce reaction products, an oxidizer in fluid communication with the reducer for supplying the oxygen carrier to the reducer after an oxidizing reaction in the oxidizer, the oxidizing reaction producing a flue gas stream containing sulfur dioxide, and a sulfur recapture loop configured to receive the flue gas stream from the oxidizer. In the sulfur recapture loop a temperature of the flue gas stream is reduced and a calcium-based makeup material is reacted with the sulfur dioxide in the flue gas stream to capture the sulfur dioxide from the flue gas stream so that the captured sulfur dioxide in the form of, for example, $CaSO_4$, can be recycled to the reducer.

Referring to FIG. 1, a calcium-based chemical looping system 10 of a chemical looping-based power plant according to an exemplary embodiment is illustrated. The system 10 includes a first loop having a reducer 12, and a second loop having an oxidizer 14. Air 16 is supplied to the oxidizer 14, and a calcium-based oxygen carrier such as, for example, calcium sulfide (CaS) is oxidized therein to produce a calcium sulfate ($CaSO_4$). The $CaSO_4$ is supplied to the reducer 12, and acts as an oxygen carrier to deliver oxygen and heat to fuel 18 (such as coal, for example) supplied to the reducer 12. As a result, the oxygen delivered to the reducer 12 interacts with the coal 18 in the reducer 12. In particular, in the reducer 12, carbon from the fuel 18 reacts with carbon dioxide ($CO_2$) to form carbon monoxide (CO). The carbon monoxide is then oxidized by the $CaSO_4$ supplied to the reducer 12 from the oxidizer 14. Similar reactions oxidize hydrogen and volatile components of the fuel 18. Reduced CaS (produced in the reducer 12), is then returned to the oxidizer 14 to again be re-oxidized with air into $CaSO_4$, and the cycle described above repeats.

Flue gas 20 including, for example, nitrogen gas ($N_2$) and sulfur dioxide ($SO_2$), extracted from the oxidizer by a gas/solids separation device such as a cyclone, as well as heat resulting from the oxidation, exit the oxidizer 14 through a standpipe and seal device to either return to the oxidizer or reducer. Likewise, a gas 22 produced during reduction in the reducer 12 exits the reducer 12.

As shown in FIG. 1, while air 16 is supplied to the oxidizer 14, as described above, waste 20 such as ash and/or excess calcium sulfate ($CaSO_4$), are removed from the oxidizer 14 for disposal in an external facility (not shown). Typically, the coal 18, as well as makeup calcium carbonate ($CaCO_3$) 24 and recirculated steam 26, are supplied to the reducer 12 for a reduction reaction therein.

Further to the above, in operation, a series reduction reaction occurs within the reducer 12 among oxygen from the oxygen carrier and the coal 18, the $CaCO_3$ 24, and $CaSO_4$ 28, and produces calcium sulfide (CaS) 30, which is separated by a gas/solids separator 32, such as a cyclone separator 32, and is thereafter supplied to the oxidizer 14 through, for example, a seal pot control valve (SPCV) 34. A portion of the CaS and other solids 30, based upon CL plant load, for example, is recirculated to the reducer 12 by the SPCV 34, as shown in FIG. 1. In addition, the separator separates the flue gas 22, e.g., $CO_2$ and other emissions such as $SO_2$, from the CaS 30.

The CaS 30 is oxidized in an oxidation reaction in the oxidizer 14, thereby producing the $CaSO_4$ 28 which is separated from flue gas 20 by a separator 32 and is supplied back to the reducer 12 via a SPCV 34. A portion of the $CaSO_4$ 28 and CaS may be recirculated back to the oxidizer 14 by the SPCV 34 based upon CL plant load, for example. The oxidation reaction also produces heat which can be utilized in other processes. For example, as illustrated in FIG. 1, in an embodiment, a thermal loop 100 may be integrated with the system 10 to generate power. In particular, the heat produced by the oxidation reaction can be utilized in a steam/water generating device 102 to generate steam 104 which is then used to drive a steam turbine 106 which, in turn, drives a power generator 108.

In connection with the above, the reducer 12 is endothermic in that it requires energy to sustain the reactions. The oxidizer 14 is exothermic, as it releases energy. The extra energy required for the fuel reactor is provided by the oxygen carrier returning from the oxidizer 14 at a temperature hotter than the reducer 12. This ensures that nitrogen from the air is maintained in the oxidizer and does not dilute the products of combustion from the reducer 12. This makes it easier to obtain a concentrated carbon dioxide stream for use or sequestration.

As indicated above, a stream of solids, which may include a portion of the oxygen carrier in the form of calcium sulfate ($CaSO_4$), is typically removed from the system (e.g., from the oxidizer 14), which must be replaced. As also indicated above, limestone ($CaCO_3$) can be added as makeup material in the reducer 12 which reacts with the sulfur from the fuel 18 to regenerate the $CaSO_4$/CaS oxygen carrier As indicated above, in existing calcium-based chemical looping systems, sulfur can be lost from the oxygen carrier in both the reducer and the oxidizer. In particular, while the temperature within the oxidizer must typically be maintained above at least 1700° F.-1800° F. to provide enough heat to the reducer to oxidize CaS to $CaSO_4$, such high temperatures exacerbate the loss of sulfur as sulfur dioxide ($SO_2$) from the oxygen carrier, forming CaO in place of CaS or $CaSO_4$. If the sulfur loss is too high, the hot oxygen carrier returning to the reducer may not have enough $CaSO_4$ to sustain the reactions. In particular, in certain instances, the sulfur loss from the oxidizer may exceed the sulfur fed to the reducer with the coal, such that the $CaSO_4$/CaS oxygen carrier cannot be maintained in sufficient quantities to sustain the necessary reactions.

Figure 2:
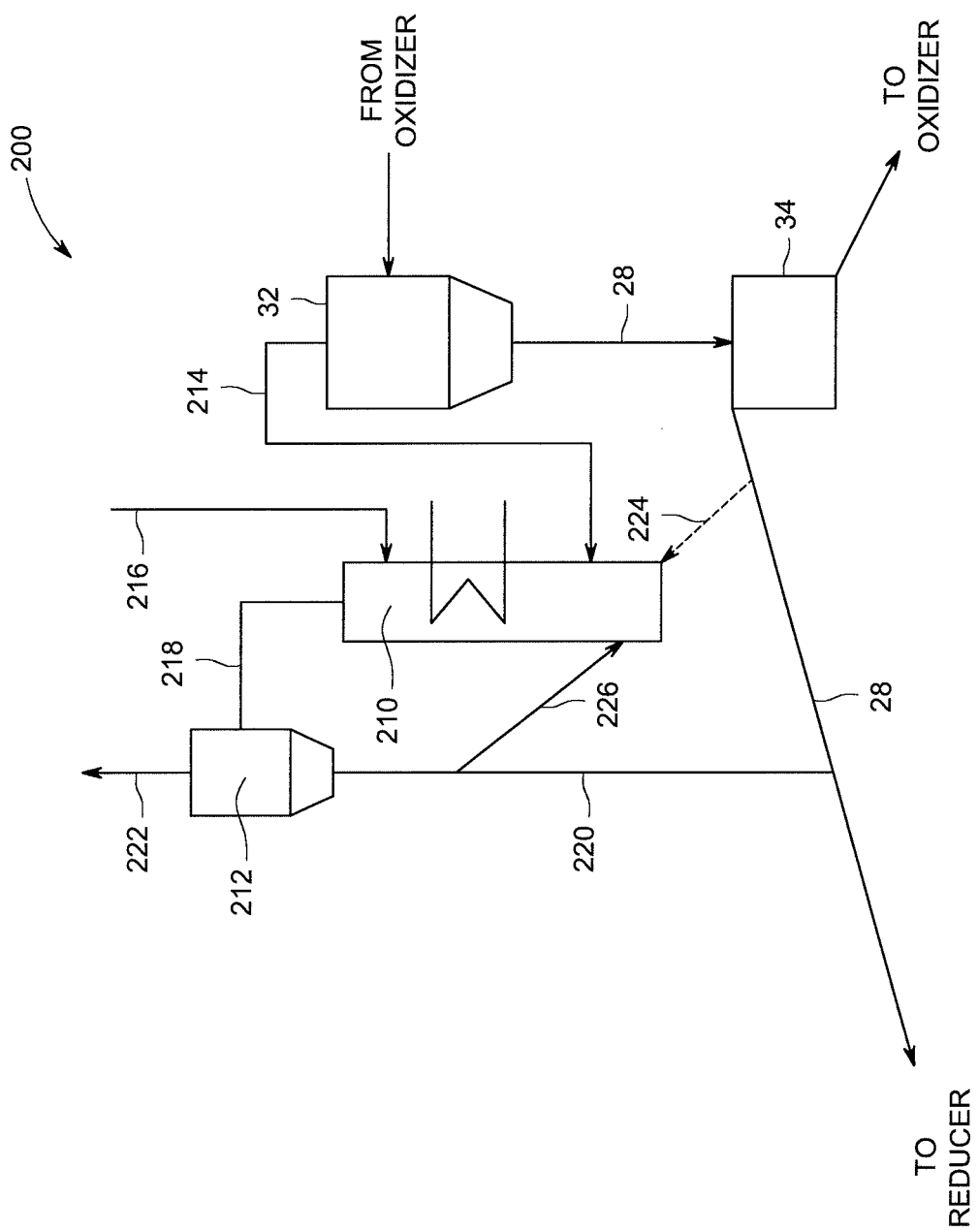
FIG. 2 is an enlarged, detail view of area A, of FIG. 1

Accordingly, as shown in FIG. 1, the system 10 of the invention employs a sulfur recapture loop 200 through which makeup limestone can be added, and via which sulfur in the flue gas stream 20 exiting the oxidizer 14 and separation device 32 can be recaptured. As best shown in FIG. 2, the sulfur recapture loop 200 includes a heat exchanger 210 and a reactor 212. The heat exchanger 210 includes an inlet that is fluidly connected to the outlet of the separation device 32 and is configured to receive a flue gas stream 214 therefrom containing emission products including, at least, a sulfur containing species such as sulfur dioxide ($SO_2$). An outlet of the heat exchanger 210 is fluidly connected to an inlet of the reactor 212. In an embodiment, the reactor 212 may be a circulating fluidized bed (CFB) reactor, although other types of reactors know in the art may also be utilized without departing from the broader aspects of the invention. The sulfur recapture loop 200 also includes an inlet for adding makeup limestone 216 to the system 10, as best shown in FIG. 2. In an embodiment, the makeup limestone 216 may be added to the recapture loop 200 via the heat exchanger 210. In another embodiment, the makeup limestone 216 may be added directly to the reactor 212.

In operation, hot flue gases 214 exiting the oxidizer 14 and separator 32 at a temperature above approximately 1700° F.-1800° F. are transported to the heat exchanger 210 where they are cooled by means known in the art. In an embodiment, the flue gases 214 are cooled by the heat exchanger 210 to between approximately 1500° F. and 1650° F. After the flue gases 214 are cooled, makeup limestone 216 is added into the loop 200. Stream 218, comprised of cooled flue gases and the makeup limestone, exits the heat exchanger 210 and enters reactor 212 where the limestone reacts with sulfur dioxide in the flue gas to produce $CaSO_4$ 220, which is added to stream 28 and supplied to the reducer 12. In this manner the sulfur dioxide from the flue gas is recaptured, ensuring that enough $CaSO_4$ is maintained in the system 10 to sustain the required reactions. After recapturing of the sulfur, flue gases 222 exit the reactor 212 for further processing, use and/or sequestration.

In an embodiment, a small amount of solids 224 from the oxidizer 14 (from stream 28 exiting the SPCV 34) can be mixed with the flue gases 214 to assist with sulfur recapture by utilizing the CaO in the solids, as illustrated in FIG. 2. As also shown in FIG. 2, in an embodiment, a portion 226 of the solids exiting the reactor 212 may be recycled to the heat exchanger 210 for further cooling and reaction with the makeup limestone, to increase the efficiency of sulfur recapture.

While FIGS. 1 and 2 illustrate the cooling of the flue gas 214 before entering the sulfur capture reactor 212, in an embodiment, the cooling step may be integral with the sulfur capture reactor.

The system and method of the invention therefore provide a means to recapture lost sulfur (in the form of ($SO_2$) at a temperature conducive to sulfur capture. In particular, the system and method of the invention prevents excessive sulfur loss from a calcium-based chemical looping system by integrating a downstream recapture loop 200 at a temperature that facilitates recapture of at least some of the lost sulfur using a makeup calcium-based material (e.g., limestone), which typically must be added to the system anyway. By recapturing the sulfur, substantially all of the sulfur needed to sustain the reactions with the system 10 utilizing a calcium-based oxygen carrier (e.g., $CaSO_4/CaS$) can be maintained within the system 10 by returning the captured sulfur to the reducer 12 in the form of $CaSO_4$.

In an embodiment, a method for recapturing sulfur in a chemical looping system is provided. The method includes the steps of receiving a flue gas stream containing a sulfur-containing species, reducing a temperature of the flue gas stream, introducing a calcium-based makeup material to the reduced temperature flue gas stream, capturing the sulfur-containing species from the reduced temperature flue gas stream, and recycling the sulfur-containing species to a reducer of the chemical looping system. In an embodiment, the sulfur-containing species is sulfur dioxide. In an embodiment, the flue gas stream is received from an oxidizer of the chemical looping system. In an embodiment, the calcium-based makeup material is limestone. In an embodiment, capturing the sulfur-containing species from the flue gas stream includes reacting the limestone with the sulfur dioxide in the flue gas stream to produce $CaSO_4$, and the $CaSO_4$ is recycled to the reducer. In an embodiment, reducing the temperature of the flue gas stream and reacting the limestone with the sulfur dioxide takes place in a reactor. In an embodiment, the reactor is a circulating fluidized bed reactor. In an embodiment, the method may also include the step of mixing a portion of solids from the oxidizer with the flue gas stream to assist with sulfur recapture. In an embodiment, the temperature of the flue gas stream is reduced in a heat exchanger. The method may also include the step of recycling at least a portion of an output of the reactor through the heat exchanger. In an embodiment, the step of reducing the temperature of the flue gas stream includes reducing the temperature of the flue gas stream from about greater than 1700° F. to between approximately 1500° F. and 1650° F.

In another embodiment, a chemical looping system is provided. The chemical looping system includes a reducer in which a fuel reacts with an oxygen carrier to produce reaction products, an oxidizer in fluid communication with the reducer for supplying the oxygen carrier to the reducer after an oxidizing reaction in the oxidizer, the oxidizing reaction producing a flue gas stream containing sulfur dioxide, and a sulfur recapture loop configured to receive the flue gas stream from the oxidizer. In the sulfur recapture loop a temperature of the flue gas stream is reduced and a calcium-based makeup material is reacted with the sulfur dioxide in the flue gas stream to capture the sulfur dioxide from the flue gas stream. In an embodiment, the sulfur recapture loop includes a heat exchanger configured to reduce the temperature of the flue gas stream and to output a cooled flue gas stream, and a reactor configured to receive the cooled flue gas stream from the heat exchanger and to receive the calcium-based makeup material, wherein in the reactor the sulfur dioxide is reacted with the calcium-based makeup material to capture the sulfur dioxide from the cooled flue gas stream. In an embodiment, the heat exchanger is integrated with the reactor. In an embodiment, the calcium-based makeup material is limestone. In an embodiment, capturing the sulfur-containing species from the cooled flue gas stream includes reacting the limestone with the sulfur dioxide in the flue gas stream to produce $CaSO_4$, and the reactor is fluidly coupled to the reducer for recycling the $CaSO_4$ to the reducer. In an embodiment, the reactor is a circulating fluidized bed reactor. In an embodiment, a solids flow path from the oxidizer is fluidly connected to the sulfur recapture loop for mixing a portion of solids from the oxidizer with the flue gas stream to assist with sulfur recapture. In an embodiment, an output of the reactor is fluidly coupled to the heat exchanger for recycling at least a portion of solid products from the reactor to the heat exchanger.

In yet another embodiment, a method for recapturing sulfur in a chemical looping system is provided. The method includes the steps of, with a heat exchanger, receiving a flue gas stream from an oxidizer, the flue gas stream containing sulfur dioxide, in the heat exchanger, reducing a temperature of the flue gas stream to produce a cooled flue gas stream, with a reactor, receiving the cooled flue gas stream from the heat exchanger, introducing limestone to the reactor, in the reactor, reacting the makeup limestone with the sulfur dioxide to produce $CaSO_4$, and transporting the $CaSO_4$ to a reducer of the chemical looping system. In an embodiment, the temperature of the flue gas stream is greater than 1700° F. and the temperature of the cooled flue gas stream is between approximately 1500° F. and 1650° F.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method for recapturing sulfur in a chemical looping system, comprising the steps of:
   receiving a flue gas stream containing a sulfur-containing species;
   in a heat exchanger, reducing a temperature of the flue gas stream from about greater than 1700° F. to between approximately 1500° F. and 1650° F.;
   introducing a calcium-based makeup material to the reduced temperature flue gas stream;
   capturing the sulfur-containing species from the reduced temperature flue gas stream; and
   recycling the sulfur-containing species to a reducer of the chemical looping system.

2. The method according to claim 1, wherein:
   the sulfur-containing species is sulfur dioxide.

3. The method according to claim 1, wherein:
   the flue gas stream is received from an oxidizer of the chemical looping system.

4. The method according to claim 3, wherein:
   the calcium-based makeup material is limestone.

5. The method according to claim 4, wherein:
   capturing the sulfur-containing species from the flue gas stream includes reacting the limestone with the sulfur dioxide in the flue gas stream to produce $CaSO_4$; and
   wherein the $CaSO_4$ is recycled to the reducer.

6. The method according to claim 5, wherein:
   reducing the temperature of the flue gas stream and reacting the limestone with the sulfur dioxide takes place in a reactor.

7. The method according to claim 6, wherein:
   the reactor is a circulating fluidized bed reactor.

8. The method according to claim 6, further comprising the step of:
   mixing a portion of solids from the oxidizer with the flue gas stream to assist with sulfur recapture.

9. The method according to claim 6, further comprising the step of:
   recycling at least a portion of an output of the reactor through the heat exchanger.

10. A method for recapturing sulfur in a chemical looping system, comprising the steps of:
    with a heat exchanger, receiving a flue gas stream having a temperature greater than 1700° F. from an oxidizer, the flue gas stream containing sulfur dioxide;
    in the heat exchanger, reducing a temperature of the flue gas stream to produce a cooled flue gas stream having a temperature between approximately 1500° F. and 1650° F.;
    with a reactor, receiving the cooled flue gas stream from the heat exchanger;
    introducing limestone to the reactor;
    in the reactor, reacting the makeup limestone with the sulfur dioxide to produce $CaSO_4$; and
    transporting the $CaSO_4$ to a reducer of the chemical looping system.

* * * * *